(12) United States Patent
Hackert et al.

(10) Patent No.: US 10,694,912 B2
(45) Date of Patent: Jun. 30, 2020

(54) SYSTEM WITH AT LEAST TWO FLOOR TREATMENT APPARATUSES

(71) Applicant: Vorwerk & Co. Interholding GmbH, Wuppertal (DE)

(72) Inventors: Georg Hackert, Bochum (DE); Martin Helmich, Duisburg (DE); Lorenz Hillen, Wuppertal (DE); Christian Holz, Dortmund (DE); Gerhard Isenberg, Cologne (DE); Hendrik Koetz, Wetter (DE); Andrej Mosebach, Bochum (DE); Roman Ortmann, Huerth (DE); Robin Dulinski, Wuppertal (DE)

(73) Assignee: VORWERK & CO. INTERHOLDING GMBH, Wuppertal (DE)

( * ) Notice: Subject to any disclaimer, the term of this patent is extended or adjusted under 35 U.S.C. 154(b) by 79 days.

(21) Appl. No.: 16/008,178

(22) Filed: Jun. 14, 2018

(65) Prior Publication Data
US 2018/0360283 A1 Dec. 20, 2018

(30) Foreign Application Priority Data
Jun. 16, 2017 (DE) .......................... 10 2017 113 287

(51) Int. Cl.
*A47L 9/28* (2006.01)
*A47L 11/10* (2006.01)
*G05D 1/02* (2020.01)

(52) U.S. Cl.
CPC ............ *A47L 9/2894* (2013.01); *A47L 9/2805* (2013.01); *A47L 11/10* (2013.01); *G05D 1/0297* (2013.01); *G05D 2201/0215* (2013.01)

(58) Field of Classification Search
None
See application file for complete search history.

(56) References Cited

U.S. PATENT DOCUMENTS

2015/0289743 A1* 10/2015 Taoka ...................... A47L 9/19
15/319

* cited by examiner

*Primary Examiner* — Eric W Golightly
*Assistant Examiner* — Arlyn I Rivera-Cordero
(74) *Attorney, Agent, or Firm* — Collard & Roe, P.C.

(57) ABSTRACT

A system has at least two floor treatment apparatuses for treating a surface in an automatically controlled fashion based on defined adjustment parameters of the floor treatment apparatus, wherein each of the floor treatment apparatuses features at least one detection device for detecting at least one detection parameter of the floor treatment apparatus and/or of an environment of the floor treatment apparatus. In order to enhance a system of this type in such a way that the floor treatment apparatuses advantageously cooperate and support one another, the system features a common database that is assigned to the floor treatment apparatuses. Detection parameters of at least two floor treatment apparatuses are stored in the database in association with the adjustment parameters of the respective floor treatment apparatus.

7 Claims, 2 Drawing Sheets

|  | Floor type | Brush position | Vehicle speed | Blower suction current | Dirt pick-up |
|---|---|---|---|---|---|
| Apparatus 1 | 1 | 1 | 1 | 1 | high |
| Apparatus 2 | 1 | 1 | 1 | 1 | high |
| Apparatus 3 | 1 | 2 | 2 | 1 | low |

Fig. 2

| | Floor type | Brush position | Vehicle speed | Blower suction current | Dirt pick-up |
|---|---|---|---|---|---|
| Apparatus 1 | 1 | 1 | 1 | 1 | high |
| Apparatus 2 | 1 | 1 | 1 | 1 | high |
| Apparatus 3 | 1 | 2 | 2 | 1 | low |

SYSTEM WITH AT LEAST TWO FLOOR TREATMENT APPARATUSES

CROSS REFERENCE TO RELATED APPLICATIONS

Applicant claims priority under 35 U.S.C. § 119 of German Application No. 10 2017 113 287.2 filed Jun. 16, 2017, the disclosure of which is incorporated by reference.

BACKGROUND OF THE INVENTION

1. Field of the Invention

The invention pertains to a system with at least two floor treatment apparatuses for treating a surface in an automatically controlled fashion based on defined adjustment parameters of the floor treatment apparatus, wherein each of the floor treatment apparatuses features at least one detection device for detecting at least one detection parameter of the floor treatment apparatus and/or of an environment of the floor treatment apparatus.

The invention furthermore pertains to a method for operating a system with at least two floor treatment apparatuses for treating a surface in an automatically controlled fashion based on defined adjustment parameters of the floor treatment apparatus, wherein each of the floor treatment apparatuses features at least one detection device that detects at least one detection parameter of the floor treatment apparatus and/or of an environment of the floor treatment apparatus.

2. Description of the Related Art

Floor treatment apparatuses are known from the prior art in a broad variety of different embodiments.

The floor treatment apparatuses may consist, e.g., of vacuuming apparatuses, wiping apparatuses, polishing apparatuses, grinding apparatuses, mowing apparatuses and the like, which are suitable for treating a surface of an environment. In this case, the floor treatment apparatuses may either be realized in the form of apparatuses that are hand-operated by a user or preferably in the form of self-traveling floor treatment apparatuses such as mobile autonomous robots.

It is known to use floor treatment apparatuses for treating a surface in an automatically controlled fashion, wherein the floor treatment apparatus carries out a work activity such as, e.g., vacuuming a surface, cleaning a surface by means of a bristle roller, applying liquid on a surface or the like. It is furthermore known to use multiple floor treatment apparatuses within a system, wherein the floor treatment apparatuses either carry out work activities simultaneously or successively.

SUMMARY OF THE INVENTION

Although autonomous floor treatment apparatuses for treating surfaces have proved to be successful, the invention aims to enhance a system with multiple floor treatment apparatuses to the effect that they advantageously cooperate and support one another.

In order to attain the above-defined objective, the invention proposes a system with at least two floor treatment apparatuses for treating a surface in an automatically controlled fashion based on defined adjustment parameters of the floor treatment apparatus, wherein the system features a common database that is assigned to the floor treatment apparatuses, and wherein detection parameters of at least two floor treatment apparatuses are stored in said database in association with the adjustment parameters of the respective floor treatment apparatus.

According to the invention, the system is now designed for making available a common database that contains detection parameters, which were recorded by detection devices of at least two different floor treatment apparatuses. The detection parameters of the different floor treatment apparatuses are stored within the common database in such a way that each floor treatment apparatus can access detection parameters of other floor treatment apparatuses. Each floor treatment apparatus particularly can access all detection parameters stored in the database. Consequently, the floor treatment apparatuses are linked within the system via the database in such a way that detection parameters recorded by detection devices of different floor treatment apparatuses are stored within the common database and therefore also available to other floor treatment apparatuses for a work cycle. The floor treatment apparatuses can derive improvements for their own work cycle based on the collected detection parameters, particularly if the adjustment parameters of the floor treatment apparatuses used or to be used are identical or at least similar. A purposeful usage schedule of multiple floor treatment apparatuses in accordance with their suitability can be established, in particular, by comparing distinct capabilities of different floor treatment apparatuses and the collected detection parameters in conjunction with upcoming floor treatment tasks.

It is proposed that the detection parameter is a property of the environment. A detection parameter particularly may be a type and/or a material and/or a structure and/or a dirt accumulation of a surface to be treated. Consequently, the detection parameters particularly are parameters of a floor surface such as its type, i.e. a hard floor surface or a carpeted floor surface. A material of the floor surface such as, among other things, wood, stone, plastic, wool or cork can also be detected. Furthermore, it may also be advantageous to detect the structure of a surface to be treated, e.g. whether a carpet consists of a short-pile or deep-carpet, a velour carpet or the like and/or of a carpet with a certain predefined or desired pile direction. In addition, the detection parameter may also concern a dirt accumulation of the floor surface, e.g. a level, type or consistency of a dirt accumulation or the like. Measures of one or more floor treatment apparatuses of the system, which are suitable for taking into account, preserving or respectively changing or improving the properties of the environment, can be specified based on the detection parameters.

It is furthermore proposed that the detection parameter is a work status of the floor treatment apparatus. The work status of the floor treatment apparatus particularly may concern a free or blocked mobility of the floor treatment apparatus, a power consumption of an electric motor of the floor treatment apparatus, a dirt pick-up of the floor treatment apparatus and/or a successfully or unsuccessfully completed work cycle of a floor treatment apparatus. The behavior of the floor treatment apparatus during the work cycle can therefore be detected for current adjustments of the floor treatment apparatus. This makes it possible to derive measures for preventing an undesirable work status, e.g. with certain adjustments of the floor treatment apparatus. An undesirable work status may concern, e.g., a floor treatment apparatus that got stuck within the environment or a blocked floor treatment element such as, e.g., a rotatable cleaning roller. The power consumption of an electric motor that drives, e.g., the driving wheels of the floor treatment apparatus or a floor treatment element can also be measured. Based on the power consumption of the electric motor, it can be detected if the respective driven component is subjected to an excessive resistance, e.g. due to blocked motion. The detection parameter may furthermore concern a floor treatment effect of the floor treatment apparatus, particularly a cleaning effect of a cleaning element. It is particularly possible to measure a dirt pick-up in that the detection device detects the surface of a cleaning element and compares the detected surface with reference elements that have different degrees of dirt accumulation. In the case of a wet-wiping apparatus, for example, the degree of dirt accumulation of a dirty liquid picked up by the floor treatment apparatus can be detected. In the case of a vacuuming apparatus, it is possible to evaluate the air being sucked in with respect to its dirt content. Another detection parameter may be a successfully or unsuccessfully completed work cycle of the floor treatment apparatus, i.e. a status that indicates whether the floor treatment apparatus was able to successfully carry out the work cycle or had to abort the work cycle due to an error.

It is proposed that the database is stored in a local memory of a floor treatment apparatus and/or in an external memory unit that is realized separately of the floor treatment apparatus, particularly on a web server or in a mobile communication device. The external memory unit particularly may be a cloud or a memory of a mobile communication device such as, e.g., a mobile telephone, a tablet computer, a laptop or even a stationary server, particularly a server of a home automation system. Consequently, the common database of the system may basically be realized in each of the floor treatment apparatuses or in a separate unit of the system. If the database is stored in a local memory of a floor treatment apparatus, the other floor treatment apparatuses of the system nevertheless also access this common database. The communication between the floor treatment apparatuses and the local memory of the floor treatment apparatus or the external memory unit is preferably realized wirelessly, particularly by means of wireless technology such as WLAN, Bluetooth or ZigBee. In addition, a wire-bound communication can basically also be used, e.g., if the memory unit is realized in a base station, with which a floor treatment apparatus can dock. The base station preferably not only serves for storing the database, but also for performing one or more service activities for a floor treatment apparatus such as, e.g., charging an accumulator of the floor treatment apparatus, emptying a dirt collection container or the like. The system may furthermore feature, e.g., a server located in a household or on the Internet, an external computer or external control unit or a correspondingly equipped smartphone and/or tablet computer with a corresponding application, which can be linked to the floor treatment apparatuses featuring the floor treatment devices and/or base stations wirelessly or, in the case of merely internal system components of a residence, also in a wire-bound fashion.

The system preferably also features a computing unit, which is either a computing unit of the floor treatment apparatus and/or a computing unit assigned to the database. Consequently, the computing unit may either be integrated into a floor treatment apparatus or realized in an external unit, e.g. in a cloud, on a local server of a household, in an external communication device such as, e.g., a mobile telephone or the like, just like the database. The computing unit is communicatively linked with the database.

It is proposed that the computing unit is designed for processing and transmitting detection parameters recorded by the detection device to the database and/or for accessing detection parameters stored in the database, as well as for calculating an adjustment parameter of a floor treatment apparatus in dependence on at least one detection parameter. According to a first embodiment, the computing unit can receive the detection parameters, e.g., directly from the respective detection device and at least partially evaluate these detection parameters, wherein the thusly processed detection parameters are transmitted to the database and thereby also made available to other floor treatment apparatuses. However, the detection parameters of the detection device may also be stored in the database in the form of raw data, in which case the computing unit assigned to the database preferably accesses the detection parameters stored in the database and calculates an adjustment parameter for a floor treatment apparatus. The detection parameters accessed by the central computing unit may either consist of raw data or at least partially evaluated detection parameters, which are then additionally processed by the central computing unit in order to generate an adjustment parameter for a floor treatment apparatus. The processing of the detection parameters by means of the local or a central external computing unit may include a comparison of recorded detection parameters of a first floor treatment apparatus with recorded detection parameters of one or more other floor treatment apparatuses and/or a comparison with reference parameters that concern, e.g., an average value of the detection parameters successfully used in a work cycle of the floor treatment apparatuses, wherein only detection parameters, which were suitable for successfully carrying out and completing a work cycle, are used as reference parameters. The adjustment parameter of the floor treatment apparatus therefore is an adjustment parameter, which according to a history of the system has led to a successful floor treatment result of this floor treatment apparatus or other floor treatment apparatuses.

It is particularly proposed that the detection parameter is a detection parameter of a first floor treatment apparatus, and that the adjustment parameter is an adjustment parameter of a second floor treatment apparatus. The computing unit is therefore designed for using a detection parameter of a first floor treatment apparatus, which is stored in the database, for calculating an adjustment parameter for another, second floor treatment apparatus. In this context, the detection parameters are respectively exchanged or used by floor treatment apparatuses, the detection devices of which have not recorded the corresponding detection parameters themselves. In this way, the floor treatment apparatuses linked within the system can optimally cooperate and support one another with the aid of the common database, to which a variety of detection parameters of different floor treatment apparatuses is added.

It is furthermore proposed that the adjustment parameter is a parameter of a working element and/or a work cycle of the floor treatment apparatus. The adjustment parameter particularly may be, e.g., a position and/or a rotational speed and/or a speed of a working element, a suction current of a motor-blower unit, a traveling speed and/or traveling direction and/or working direction of the floor treatment apparatus or a presence and/or adjustment of an attachment of the floor treatment apparatus, particularly a suction mouth and/or a sealing element. In this case, the adjustment parameter calculated by the computing unit is a parameter that leads to an advantageous adjustment of the elements, components and/or operating modes of a floor treatment apparatus such that a work cycle can be completely and successfully carried out and detection parameters, which the floor treatment apparatus records during the work cycle carried out with these adjustment parameters, in turn preferably resemble or correspond to reference parameters, i.e. they allow a free motion of the floor treatment apparatus, preferably reduce the power consumption of the electric motor, increase the dirt pick-up of the floor treatment apparatus and the like. Consequently, the adjustment parameters made available prevent, for example, the floor treatment apparatus from getting stuck, e.g., on a deep-pile carpet, specify a working direction in the pile direction or adapt the rotational speed and/or rotating direction of a bristle roller, a suction current, a driving speed or a position of a suction mouth and/or the housing of the floor treatment apparatus in such a way that no malfunction of the floor treatment apparatus occurs, but the work cycle can in fact be optimally carried out. If applicable, the exchange of an attachment for a cleaning apparatus, e.g. a suction nozzle, or a modification of the attachment such as the use of a certain bristle roller, an adjustment of a sealing element, e.g. a flexible sealing strip, a bristle element or the like, may also be suggested.

It is furthermore proposed that the system features a control unit, which accesses the database and is designed for controlling the floor treatment apparatus based on an adjustment parameter. The control unit may either be a local control unit of the floor treatment apparatus or a central, common control unit for all floor treatment apparatuses, which controls the function of the floor treatment apparatus or the adjustment of the adjustment parameters externally. In the latter instance, the usage schedule of the floor treatment apparatus can be established by a central control unit, which can centrally specify a purposeful usage schedule for one or more floor treatment apparatuses in accordance with their suitability for use. The control unit may be a dedicated control unit of the controlled floor treatment apparatus or a control unit of an external device such as, e.g., an external PC, a mobile communication device, a web server or the like.

In addition to the above-described system, the invention furthermore proposes a method for operating a system with at least two floor treatment apparatuses for treating a surface in an automatically controlled fashion based on defined adjustment parameters of the floor treatment apparatus, wherein each of the floor treatment apparatuses features at least one detection device that detects at least one detection parameter of the floor treatment apparatus and/or of an environment of the floor treatment apparatus, and wherein detection parameters of at least two floor treatment apparatuses are stored in a common database assigned to the floor treatment apparatuses in association with the adjustment parameters of the respective floor treatment apparatus. It would particularly be conceivable that an adjustment parameter of a floor treatment apparatus is calculated in dependence on at least one detection parameter stored in the database.

The proposed method is particularly suitable for operating an above-described system comprising multiple floor treatment apparatuses. The characteristics and advantages described above with reference to the system therefore also apply accordingly to the method.

According to the inventive method, a detection device of a floor treatment apparatus particularly may detect a detection parameter in the form of a property of the environment, particularly a type and/or a material and/or a structure and/or a dirt accumulation of a surface to be treated. In addition, a detection parameter in the form of a work status of the floor treatment apparatus may also be detected, wherein the detection device detects, e.g., a free or blocked mobility of the floor treatment apparatus, a power consumption of an electric motor of the floor treatment apparatus, a dirt pick-up of the floor treatment apparatus and/or a successfully or unsuccessfully completed work cycle of the floor treatment apparatus. The detected detection parameters are stored in the common database assigned to the floor treatment apparatuses, wherein said database is stored in a local memory of a floor treatment apparatus and/or in an external memory unit that is realized separately of the floor treatment apparatus, particularly on a web server or in a mobile communication device. A computing unit of the floor treatment apparatus and/or a computing unit assigned to the database can evaluate and additionally process the detection parameters. It would particularly be conceivable that the computing unit processes and transmits detection parameters recorded by the detection device to the database and/or accesses detection parameters stored in the database, as well as calculates an adjustment parameter of a floor treatment apparatus in dependence on at least one detection parameter. The computing unit advantageously processes one or more detection parameters of a first floor treatment apparatus and calculates one or more adjustment parameters of a second floor treatment apparatus based on the processed detection parameters. In this way, multiple floor treatment apparatuses of the system preferably cooperate with one another such that a floor treatment apparatus can be advantageously adjusted in dependence on detection parameters, which were recorded by a detection device of one or more other floor treatment apparatuses. It is therefore not required that each floor treatment apparatus of the system records all detection parameters itself. In fact, the floor treatment apparatuses can also benefit from the information of other floor treatment apparatuses. It is particularly also possible to determine working parameters, i.e. adjustment parameters of a floor treatment apparatus, by means of a supplementary simulation or experimentation of a floor treatment operation. The detection parameters, which are recorded by a variety of floor treatment apparatuses and stored in a common database, are made available to the individual floor treatment apparatuses, wherein adjustment parameters of the floor treatment apparatuses can be overwritten in dependence on newly recorded detection parameters. A usage schedule for one or more floor treatment apparatuses can be established by a central control unit or a local control unit of a floor treatment apparatus based on the broad variety of detection parameters, wherein the individual known adjustment parameters of the floor treatment apparatuses and the detected detection parameters are reconciled with the upcoming cleaning tasks of one or more floor treatment apparatuses, and wherein a purposeful usage schedule can also be specified in dependence on an individual suitability of a floor treatment apparatus. For example, an adjustment parameter in the form of a parameter of a working element and/or a work cycle of the floor treatment apparatus can be calculated in dependence on the processed detection parameters. It is particularly possible to specify a position and/or a rotational speed and/or a speed of a working element, a suction current of a motor-blower unit, a traveling speed and/or traveling direction and/or working direction of the floor treatment apparatus or a presence and/or adjustment of an attachment of the floor treatment apparatus, particularly a suction mouth and/or a sealing element. Subsequently, a local control unit of the floor treatment apparatus or a common control unit assigned to multiple floor treatment apparatuses controls the respective floor treatment apparatus in dependence on the adjusted adjustment parameters by using one or more adjustment parameters.

BRIEF DESCRIPTION OF THE DRAWINGS

The invention is described in greater detail below with reference to exemplary embodiments. In the drawings:

FIG. 2 shows an exemplary database for three floor treatment apparatuses.

DETAILED DESCRIPTION OF THE PREFERRED EMBODIMENTS

Figure 1:
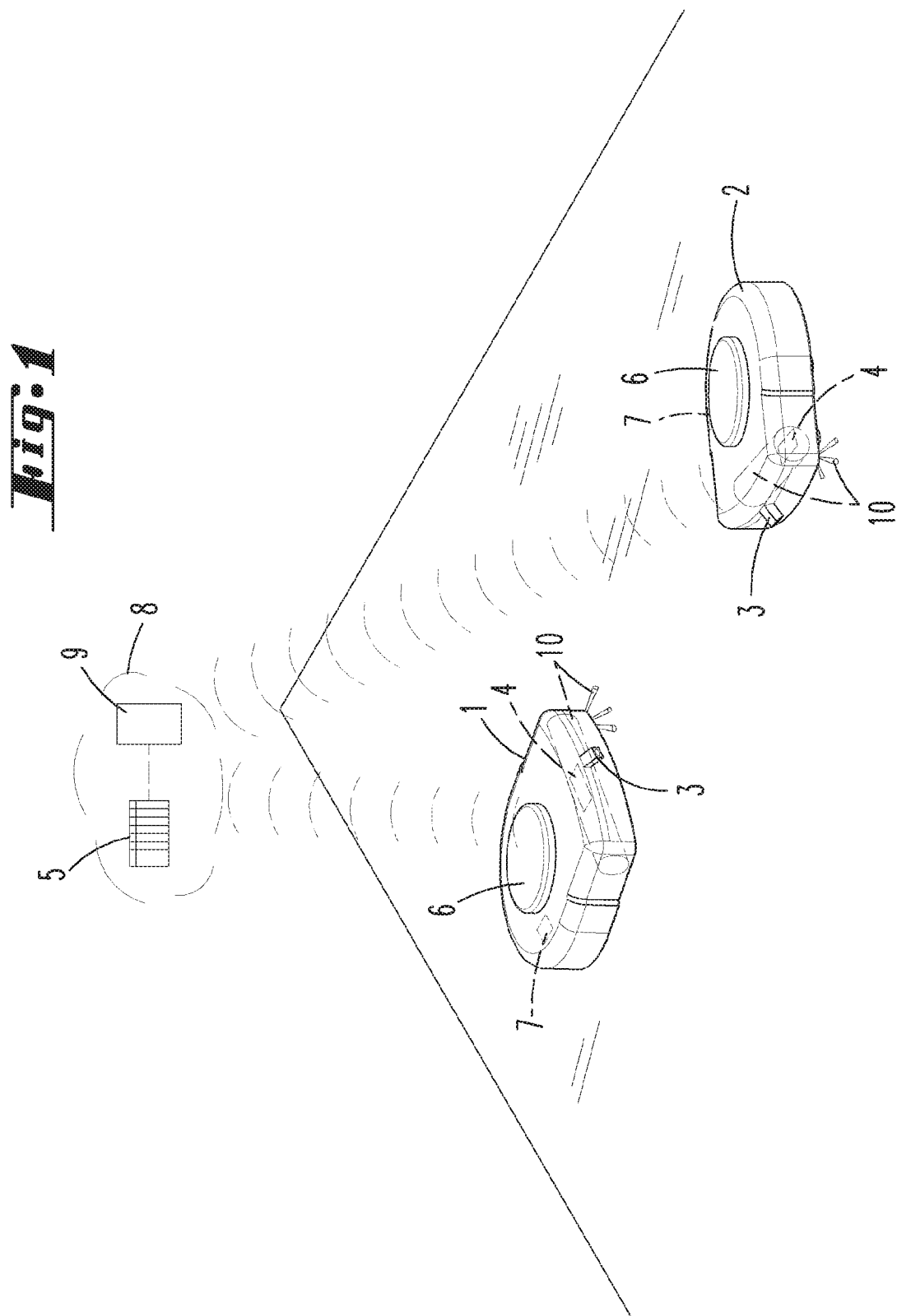
FIG. 1 shows a system with two floor treatment apparatuses and a common database assigned to the floor treatment apparatuses.

FIG. 1 shows an environment such as, e.g., a section of a room of a residence. The room may contain (not-shown) obstacles such as pieces of furniture, walls and the like. A system comprising two floor treatment apparatuses 1, 2, which in this case are realized in the form of self-traveling floor treatment apparatuses 1, 2, namely cleaning robots, is located in the environment as shown. In addition to the floor treatment apparatuses 1, 2, the system features a common database 5 that is assigned to the floor treatment apparatuses 1, 2. The database 5 is stored in an external memory unit 8, with which both floor treatment apparatuses 1, 2 are communicatively linked, in this example via a WLAN connection. The external memory unit 8 furthermore features a computing unit 9 that can access the database 5 and select, process, overwrite or delete data contained therein. In this example, the external memory unit 8 is a web server (cloud). In addition to the two floor treatment apparatuses 1, 2 shown, the system may comprise additional floor treatment apparatuses that can likewise access the common database 5 within the external memory unit 8.

Although this is not illustrated in the figure, the memory unit 8 may also be a local server that is arranged in a residence and realized, e.g., as part of a base station designed for performing one or more service activities for one or more floor treatment apparatuses 1, 2. The floor treatment apparatus 1, 2 can connect to such a base station, e.g., in order to charge an accumulator or to empty a dirt collection container.

In this case, the floor treatment apparatuses 1, 2 respectively feature a local memory 7 that is integrated into the respective floor treatment apparatus 1, 2. For example, an environment map of the environment may be stored in the local memory 7, wherein a navigation and self-localization system of the floor treatment apparatus 1, 2 can orient itself based on said environment map in order to travel within the environment by itself and without colliding with obstacles located therein. Furthermore, a local memory 7 of one of the floor treatment apparatus 1, 2 may also serve as common memory unit 8 of the system and accordingly contain the common database 5 assigned to the floor treatment apparatuses 1, 2. Although the database 5 is locally integrated into one of the floor treatment apparatuses 1, 2 in this embodiment, all floor treatment apparatuses 1, 2 of the system access this database 5 in order to jointly use and also make available data to other floor treatment apparatuses 1, 2.

In this example, the floor treatment apparatuses 1, 2 consist of floor treatment apparatuses 1, 2 in the form of vacuuming robots. However, the floor treatment apparatuses 1, 2 may also consist of different apparatuses such as, among other things, wiping apparatuses, grinding apparatuses or polishing apparatuses. It would also be conceivable that one or more of the floor treatment apparatuses 1, 2 of the system are not realized in a self-traveling fashion, but rather manually guided over a surface to be treated by a user. In the example shown, the floor treatment apparatuses 1, 2 feature motor-driven wheels, by means of which the respective floor treatment apparatus 1, 2 can travel within the environment. The floor treatment apparatuses 1, 2 furthermore feature working elements 10, in this example a bristle roller that rotates about an essentially horizontal axis and acts upon a surface to be cleaned. The floor treatment apparatuses 1, 2 also feature a not-shown suction mouth, through which air contaminated with dirt can be sucked into the floor treatment apparatus 1, 2 by means of a motor-blower unit. In addition, the floor treatment apparatuses 1, 2 respectively feature a not-shown accumulator for the power supply of the electrical components of the floor treatment apparatuses 1, 2, e.g. the drive for the wheels, the working elements 10 and additionally provided electronics.

The floor treatment apparatuses 1, 2 are furthermore equipped with a distance measuring device 6, which in this example features a triangulation measuring device. The distance measuring device 6 measures distances from obstacles and walls within the environment. The detection device 6 specifically features, e.g., a laser diode, the light beam of which is emitted from a housing of the floor treatment apparatus 1, 2 by means of a deflection device and rotatable, particularly within an angular range of 360 degrees, about a rotational axis that extends vertically in the orientation of the floor treatment apparatus 1, 2 shown. An all-around distance measurement about the floor treatment apparatus 1, 2 can thereby be realized. The detection device 6 makes it possible to survey the environment in a preferably horizontal plane, i.e. in a plane extending parallel to the surface to be cleaned. In this way, the floor treatment apparatus 1, 2 can travel within the environment while avoiding a collision with obstacles or walls. The environment data recorded by means of the detection device 6 is used for generating an environment map of the environment. Furthermore, the floor treatment apparatus 1, 2 may feature, for example, a not-shown odometry sensor that measures the distance traveled by the respective floor treatment apparatus 1, 2. It would furthermore be conceivable, for example, that a floor treatment apparatus 1, 2 features a contact sensor or the like.

The floor treatment apparatuses 1, 2 furthermore feature a (not-shown) communication module, particularly a wireless module such as a WLAN module, in order to establish a communication link with the common memory unit 8.

In addition, each floor treatment apparatus 1, 2 features multiple detection devices 3, 4. In this case, a detection device 3 is designed for detecting a floor type of the surface to be cleaned. For example, the detection device 3 consists of an image acquisition device, in this case a camera. An image of the surface to be cleaned is recorded by means of the detection device 3 and compared with reference data, which is representative, e.g., for carpeted floors, wood floors, tiles, stone floors and the like, in order to detect a floor type. In addition to detecting the floor type, the detection device 3 may also be designed for detecting a type and/or a degree of dirt accumulation of the surface to be cleaned. Another detection device 4 consists, e.g., of an optical sensor that detects a position of a working element 10, in this case a bristle roller, relative to the surface to be cleaned. The working element 10 can assume different positions, e.g., a position, in which the working element 10 is lifted off the surface to be cleaned, and a position, in which the working element is lowered onto the surface to be cleaned. The working element 10 is lifted off the surface to be cleaned, e.g., when cleaning a deep-pile carpet. In contrast, the working element 10 is lowered onto the surface to be cleaned when cleaning a short-pile carpet.

The invention is implemented in that the floor treatment apparatuses 1, 2 travel around within the environment and in the process carry out a cleaning activity by sucking air into the floor treatment apparatus 1, 2 by means of the motor-blower unit on the one hand and picking up dirt from the surface to be cleaned by means of the working element 10 on the other hand. In this case, the floor treatment apparatuses 1, 2 operate in accordance with pre-adjusted adjustment parameters 12, which represent adjustments of the individual components of the respective floor treatment apparatus 1, 2. In this example, the adjustment parameters are a position of the working element 10, a traveling speed of the floor treatment apparatus 1, 2 and a defined suction current of the motor-blower unit of the floor treatment apparatus 1, 2. The current adjustment parameters 12 of the respective floor treatment apparatus 1, 2 are transmitted to the database 5 stored within the external memory unit 8 and associated with the respective floor treatment apparatus 1, 2 therein.

FIG. 2 shows part of an exemplary database 5, in which adjustment parameters 12 and detection parameters 11 for each floor treatment apparatus 1, 2 are stored. In this case, the adjustment parameters 12 and the detection parameters 11 are indicated dimensionless in the form of different values "1" and "2," which are representative for real values. The adjustment parameters 12 of the floor treatment apparatuses 1, 2 represent the position of the working element 10 (brush position), the traveling speed of the floor treatment apparatus 1, 2 (vehicle speed) and the nominal suction current (suction current/blower) generated by the motor-blower unit. The database 5 furthermore contains detection parameters 11 that are recorded by the detection devices 3, 4 of the floor treatment apparatuses 1, 2—and assigned to the adjustment parameters 12—in this example a floor type of the surface to be cleaned, which is detected by the detection device 3, and a dirt pick-up concerning an amount of dirt contained in the suction air current and an amount of dirt located on the working element 10 (dirt pick-up), which is detected by the detection device 4. Consequently, the database 5 contains the detection parameters 11 recorded by the detection devices 3, 4 during the work cycle for each of the floor treatment apparatuses 1, 2 and its current adjustment parameters 12. The data is stored in the database 5 is made available to all floor treatment apparatuses 1, 2 of the system. The computing unit 9 assigned to the database 5 accesses and additionally processes the data stored in the database 5 in order to calculate future adjustment parameters 12 for one or more floor treatment apparatuses 1, 2.

With respect to the operation of the second floor treatment apparatus 2 (apparatus 2), it is possible to access, e.g., the detection parameters 11 and adjustment parameters 12 of the first floor treatment apparatus 1 (apparatus 1) stored in the database 5 in order to derive adjustment parameters 12 for the upcoming work cycle of the second floor treatment apparatus 2 in dependence thereon. If the floor treatment apparatus 2 should carry out a cleaning operation, e.g., on a carpet (floor type "1"), the computing unit 9 accesses all data concerning cleaning operations of a carpet within the database 5. In this case, it can be gathered from the database 5, e.g. a data set of the first floor treatment apparatus 1, that the floor type carpet was treated with a brush position "1," which corresponds to the position, in which the brush is lowered onto the surface to be cleaned. Furthermore, the traveling speed of the floor treatment apparatus 1 amounted to "1" and the motor-blower unit had a nominal suction current of "1." At these adjustment parameters 12, the detection parameter 11 "dirt pick-up" was detected for the first floor treatment apparatus 1 and evaluated as "high." The computing unit 9 subsequently determines that the adjustment parameters 12 of the first floor treatment apparatus 1 resulted in optimal dirt pick-up on the floor type carpet, whereupon a control unit can also control the second floor treatment apparatus 2 with these adjustment parameters 12 in order to achieve a "high" dirt pick-up. The control unit may either consist of a control unit that is integrated into the floor treatment apparatus 2 or of a control unit that is located in the external memory unit 8 and controls the floor treatment apparatus 2 externally.

For example, a third floor treatment apparatus (apparatus 3), which is not illustrated in FIG. 1, may furthermore be integrated into the system. A detection device 4 of the apparatus can determine, e.g., that only a low dirt pick-up was achieved on the floor type carpet. In order to change the detection parameter 11 "dirt pick-up" based on this information in such a way that an optimal value is achieved, the computing unit 9 can evaluate the adjustment parameters 12 of the other floor treatment apparatuses 1, 2 in the database 5 and filter out the adjustment parameters 12, which have resulted in a high dirt pick-up. The computing unit 9 can then transmit these adjustment parameters 12 to the control unit, which thereupon also changes the adjustment parameters 12 of the third apparatus in such a way that the dirt pick-up of the third apparatus becomes "high." In this example, the position of the working element 10 and the traveling speed of the apparatus are changed, wherein the position of the working element 10 is particularly changed from a position, in which it is lifted off the surface, to a position, in which it is lowered onto the surface, and the speed of the vehicle is lowered such that the apparatus remains over a certain section of the surface to be cleaned for a longer period of time. In this way, the overall dirt pick-up can be increased.

Although this was not described with reference to the exemplary embodiment, other detection devices 3, 4 may also be arranged on the floor treatment apparatuses 1, 2 in order to detect additional or other detection parameters 11. These detection parameters 11 may include, for example, a material, a structure and/or a degree of dirt accumulation of the surface to be cleaned or a free or blocked mobility of the floor treatment apparatus 1, 2 or of a working element 10 of the floor treatment apparatus 1, 2. For example, additional detection parameters 11 may be a current power consumption of an electric motor of the floor treatment apparatus 1, 2, e.g. an electric motor used for driving the floor treatment apparatus 1, 2 or a working element 10.

Adjustment parameters 12 of the floor treatment apparatuses 1, 2 other than those described above may also be additional parameters of the working element 10 or the work cycle of the floor treatment apparatus 1, 2, e.g. a rotational speed and/or a speed of a working element 10, a traveling direction and/or working direction of the floor treatment apparatus 1, 2, a presence and/or adjustment of an attachment of the floor treatment apparatus 1, 2 and the like. A few of the adjustment parameters 12 may simultaneously also be detection parameters 11. For example, a suction current of the motor-blower unit may on the one hand define a nominal value as adjustment parameter 12 and an actual suction current may on the other hand be measured as detection parameter 11 in the sense of a target-performance comparison. This applies accordingly, for example, to a traveling speed of the floor treatment apparatus 1, 2 or a power consumption of an electric motor of the floor treatment apparatus 1, 2.

LIST OF REFERENCE SYMBOLS

1 Floor treatment apparatus
2 Floor treatment apparatus
3 Detection device
4 Detection device
5 Database
6 Distance measuring device
7 Memory
8 Memory unit
9 Computing unit
10 Working element
11 Detection parameter
12 Adjustment parameter

What is claimed is:

1. A method for operating a system with at least two floor treatment apparatuses for treating a surface in an automatically controlled fashion based on defined adjustment parameters of the floor treatment apparatuses, wherein each of the floor treatment apparatuses features at least one working element in the form of a floor treatment element driven by an electric motor, and at least one detection device that detects at least one detection parameter of the floor treatment apparatus and/or of an environment of the floor treatment apparatus, comprising the following steps:

storing the detection parameters of the at least two floor treatment apparatuses in a common database assigned to the floor treatment apparatuses in association with the adjustment parameters of the respective floor treatment apparatus, and calculating the adjustment parameter of one of the floor treatment apparatuses based on at least one of the detection parameters stored in the database, wherein each detection parameter is a property of the environment consisting of at least one of a type of surface to be treated, a material of the surface to be treated, a structure of the surface to be treated, and/or a work status of the floor treatment apparatus, the work status being one of a free or blocked mobility of the floor treatment apparatus, a power consumption of an electric motor of the floor treatment apparatus, and wherein the adjustment parameter is at least one of a position of the working element, a rotational speed of the working element, a speed of the working element, a suction current of a motor-blower unit or a presence and/or adjustment of an attachment of the floor treatment apparatus, the attachment being a suction mouth and/or a sealing element.

2. A system comprising:

at least two floor treatment apparatuses configured for treating a surface in an automatically controlled fashion based on a defined adjustment parameter of at least one of the floor treatment apparatuses, wherein each of floor treatment apparatuses features at least one working element in the form of a floor treatment element driven by an electric motor, and at least one detection device for detecting at least one detection parameter of the respective floor treatment apparatus and/or of an environment of the floor treatment apparatus; and a common database that is assigned to the floor treatment apparatuses, wherein the detection parameters of the at least two floor treatment apparatuses are stored in said database in association with the adjustment parameters of the respective floor treatment apparatus, wherein each detection parameter is a property of the environment consisting of at least one of a type of surface to be treated, a material of the surface to be treated, a structure of the surface to be treated, and/or a work status of the floor treatment apparatus, the work status being one of a free or blocked mobility of the floor treatment apparatus, a power consumption of an electric motor of the floor treatment apparatus, and wherein the adjustment parameter is at least one of a position of the working element, a rotational speed of the working element, a speed of the working element, a suction current of a motor-blower unit or a presence and/or adjustment of an attachment of the floor treatment apparatus, the attachment being a suction mouth and/or a sealing element.

3. The system according to claim 2, wherein the database is stored in a local memory of one of the floor treatment apparatuses and/or in an external memory unit that is separate from the floor treatment apparatuses, the external memory unit being located on a web server or in a mobile communication device.

4. The system according to claim 2, further comprising a control unit that accesses the database and is designed for controlling the floor treatment apparatus based on the adjustment parameter.

5. The system according to claim 2, further comprising a computing unit that is disposed in the floor treatment apparatus and/or assigned to the database.

6. The system according to claim 5, wherein the computing unit is designed for processing and transmitting detection parameters recorded by the detection device to the database and/or for accessing detection parameters stored in the database, as well as for calculating an adjustment parameter of one of the floor treatment apparatuses in dependence on at least one of the detection parameters.

7. The system according to claim 6, wherein the detection parameters include a detection parameter of a first one of the floor treatment apparatuses and wherein the adjustment parameter is an adjustment parameter of a second one of the floor treatment apparatuses.

\* \* \* \* \*